(12) United States Patent
Zimmerman et al.

(10) Patent No.: US 11,511,582 B2
(45) Date of Patent: Nov. 29, 2022

(54) BUSHING WITH WEAR PAD RETAINER

(71) Applicant: Hendrickson USA, L.L.C., Itasca, IL (US)

(72) Inventors: Randy J. Zimmerman, Spencerville, IN (US); Emmanuel Simeakis, Westmont, IL (US); Ashley Thomas Dudding, Yorkville, IL (US)

(73) Assignee: Hendrickson USA, L.L.C., Itasca, IL (US)

( * ) Notice: Subject to any disclaimer, the term of this patent is extended or adjusted under 35 U.S.C. 154(b) by 296 days.

(21) Appl. No.: 16/651,446

(22) PCT Filed: Oct. 3, 2018

(86) PCT No.: PCT/US2018/054211
§ 371 (c)(1),
(2) Date: Mar. 27, 2020

(87) PCT Pub. No.: WO2019/070882
PCT Pub. Date: Apr. 11, 2019

(65) Prior Publication Data
US 2020/0282784 A1    Sep. 10, 2020

Related U.S. Application Data

(60) Provisional application No. 62/567,550, filed on Oct. 3, 2017.

(51) Int. Cl.
*F16F 1/38*      (2006.01)
*B60G 7/02*     (2006.01)

(52) U.S. Cl.
CPC .............. *B60G 7/02* (2013.01); *F16F 1/3835* (2013.01); *F16F 1/3842* (2013.01);
(Continued)

(58) Field of Classification Search
CPC .. B60G 7/02; B60G 2204/41; B60G 2206/91; F16F 1/38; F16F 1/3835; F16F 1/3842; F16F 2226/04; F16F 2230/0005
See application file for complete search history.

(56) References Cited

U.S. PATENT DOCUMENTS 3,976,338 A    8/1976   Trachte et al.
4,991,868 A    2/1991   VanDenberg
(Continued)

FOREIGN PATENT DOCUMENTS

DE         19742044 A1    4/1998
EP          1884670 A2    2/2008
(Continued)

OTHER PUBLICATIONS

International Search Report and Written Opinion from the International Searching Authority for International Application No. PCT/US2018/054211, dated Jan. 18, 2019 (15 Pages).

*Primary Examiner* — Thomas W Irvin
(74) *Attorney, Agent, or Firm* — Cook Alex Ltd.

(57) ABSTRACT

A bushing is disclosed for pivotally mounting an end portion of an axle-supporting beam of a vehicle suspension system to a hanger bracket of the vehicle with a pair of wear pads positioned between sides of the end portion of the beam and the hanger bracket, where the pair of wear pads each has a central opening defined by an inner edge. The bushing includes a tubular body having a longitudinal axis, a first end portion, a second end portion and a beam support portion positioned between the first and second end portions. A first resilient wear pad retainer extends radially from the first end portion of the body and a second resilient wear pad retainer extends radially from the second end portion of the body. Each of the first and second wear pad retainers are configured to move into a deflected position when contacted by an inner edge of a wear pad central opening and to rebound (Continued)

back to an original position afterwards as the wear pad is positioned on the first or second end portions of the body so that the wear pad is secured to the bushing.

17 Claims, 11 Drawing Sheets

(52) U.S. Cl.
CPC ...... *B60G 2204/41* (2013.01); *B60G 2206/91* (2013.01); *F16F 2226/04* (2013.01); *F16F 2230/0005* (2013.01)

(56) References Cited

U.S. PATENT DOCUMENTS

| | | | | |
|---|---|---|---|---|
| 5,540,420 A * | 7/1996 | Luzsicza | ................... | F16F 1/38 267/141.1 |
| 6,817,599 B2 * | 11/2004 | Kato | ..................... | F16F 1/3835 267/140 |
| 7,722,018 B2 * | 5/2010 | Meyerboeck | ......... | F16F 1/3842 267/293 |
| 8,579,510 B2 * | 11/2013 | Noble | ................... | F16F 1/3842 384/129 |
| 9,709,116 B2 * | 7/2017 | Shimada | ............... | F16F 1/3828 |
| 10,508,701 B2 * | 12/2019 | Cerri, III | ............... | B60G 7/008 |
| 10,704,637 B2 * | 7/2020 | Zimmerman | ......... | F16F 1/3863 |
| 2007/0241526 A1 * | 10/2007 | Plante | ...................... | F16F 1/16 280/124.107 |
| 2008/0029943 A1 * | 2/2008 | Mayerboeck | ......... | F16F 1/3842 267/141.2 |
| 2012/0175831 A1 * | 7/2012 | Kieffer | .................. | F16F 1/3828 29/530 |
| 2015/0204405 A1 * | 7/2015 | Shimada | ............... | F16F 1/3828 267/141.2 |
| 2015/0323031 A1 | 11/2015 | Yahata | | |
| 2017/0051804 A1 * | 2/2017 | Zimmerman | ........... | F16C 11/04 |
| 2018/0291975 A1 * | 10/2018 | Cerri, III | ............... | B60G 7/001 |
| 2020/0047578 A1 * | 2/2020 | Wieczorek | ........... | F16F 1/3835 |
| 2021/0016623 A1 * | 1/2021 | Kim | ....................... | B60G 7/001 |
| 2021/0403120 A1 * | 12/2021 | Camp | .................. | F16F 1/3732 |

FOREIGN PATENT DOCUMENTS

| | | |
|---|---|---|
| GB | 2389162 A | 12/2003 |
| JP | H1163058 A | 3/1999 |

* cited by examiner

BUSHING WITH WEAR PAD RETAINER

CLAIM OF PRIORITY

This application is the U.S. National Stage of PCT International Patent Application No. PCT/US2018/054211, filed Oct. 3, 2018, which claims the benefit of U.S. Provisional Application No. 62/567,550, filed Oct. 3, 2017, the contents of which are hereby incorporated by reference.

FIELD OF THE INVENTION

The present disclosure relates generally to vehicle suspension systems and, in particular, to a pivot bushing with wear pad retainers that position and secure wear pads onto the bushing.

BACKGROUND

Trailing-arm suspensions are used in a variety of vehicle applications and feature a variety of designs and configurations. Regardless of the application, however, a trailing arm suspension typically features, on each side of the vehicle and with reference to FIG. 1, a main support member or beam 20 pivotally attached at the leading or proximal end via a bushing assembly 21 to a frame hanger bracket 22. The upper end of the frame hanger bracket is typically mounted to the frame 24 of the vehicle. A vehicle axle 26 is typically secured to a middle portion of the beam 20, and the trailing or distal end 28 of the beam is attached to the vehicle frame via an air spring 32.

An exploded view of a prior art bushing assembly is illustrated in FIG. 2. The bushing assembly includes a pivot bushing 34 sized to be received within the beam tube, such as the steel tube indicated at 36, of the beam. The pivot bushing is typically constructed from a metal tubular core with a rubber jacket secured thereto by adhesive or a molding process. Wear pads 38a and 38b are positioned on opposite sides of the pivot bushing 34 on reduced diameter portions 35, and the assembly, including the beam tube 36, is positioned between the downward extending mounting flanges of the hanger bracket, indicated at 42a, 42b and 44, respectively. A bolt 46 passes through outer washers 48a and 48b, eccentric inner washers 52a and 52b and openings 54 formed in the mounting flanges 42a and 42b. The bolt also passes through central openings 56a, 56b and 58 of the wear pads 38a and 38b and the pivot bushing 34. One or more nuts 59 are received on the threaded end of the bold 46 to secure the assembly together.

The wear pads 38a and 38b of FIG. 2 minimize or prevent components that move in relation to one another from wearing in locations where they would otherwise interface during normal rotational, torsional and axial movement in the bushing. In addition, the wear pads control expansion of the rubber portion of the bushing.

Assembly of beam tube 36 into the hanger bracket 44 with the pivot bushing 34 and wear pads 38a and 38b installed in the manner described above is often problematic, however, in that the wear pads may fall off of the reduced diameter portions (35 of FIG. 2) of the pivot bushing. To address this issue, mechanics are forced to use their hands or tape to hold the wear pads in place on the bushing, both of which are awkward, time consuming and unreliable approaches.

A pivot bushing and assembly that addresses the above issue is desirable.

SUMMARY OF THE DISCLOSURE

There are several aspects of the present subject matter which may be embodied separately or together in the devices and systems described and claimed below. These aspects may be employed alone or in combination with other aspects of the subject matter described herein, and the description of these aspects together is not intended to preclude the use of these aspects separately or the claiming of such aspects separately or in different combinations as set forth in the claims appended hereto.

In one aspect, a bushing is provided for pivotally mounting an end portion of an axle-supporting beam of a vehicle suspension system to a hanger bracket of the vehicle with a pair of wear pads positioned between sides of the end portion of the beam and the hanger bracket, where the pair of wear pads each has a central opening defined by an inner edge. The bushing includes a tubular body having a longitudinal axis, a first end portion, a second end portion and a beam support portion positioned between the first and second end portions. A first resilient wear pad retainer extends radially from the first end portion of the body and a second resilient wear pad retainer extends radially from the second end portion of the body. Each of the first and second wear pad retainers is configured to move into a deflected position when contacted by an inner edge of a wear pad central opening and to rebound back to an original position afterwards as the wear pad is positioned on the first or second end portions of the body so that the wear pad is secured to the bushing.

In another aspect, an assembly features a bushing including a tubular body having a longitudinal axis, a first end portion, a second end portion and a beam support portion positioned between the first and second end portions. The bushing also includes a first resilient wear pad retainer extending radially from the first end portion of the body. The assembly also has a first wear pad including a first wear pad inner edge defining a first wear pad central opening. The first wear pad central opening has a first diameter such that the first wear pad retainer moves into a deflected position when contacted by the first wear pad inner edge and rebounds back to an original position afterwards as the first wear pad is positioned on the first end portion of the bushing body so that the first wear pad is secured to the bushing.

In another aspect, a method is provided for assembling a first wear pad onto a pivot bushing having a first end portion, where the first wear pad has a central opening defined by an inner edge. The method includes the steps of moving the first wear pad onto the first end portion of the bushing so that the first end portion is received through the central opening of the first wear pad; engaging a first resilient wear pad retainer extending radially from the first end portion of the bushing with the inner edge of the first wear pad so that the first resilient wear pad retainer is moved into a deflected position and passing the first wear pad over the first resilient wear pad retainer so that the first resilient wear pad retainer rebounds back to an original position whereby the first wear pad is positioned and secured on the first end portion of the bushing.

In still another aspect, a method is provided for assembling first and second wear pads onto a pivot bushing having a first end portion and a second end portion, where the first and second wear pads each have a central opening defined by an inner edge. The method includes the steps of moving the first wear pad onto the first end portion of the bushing so that the first end portion is received through the central opening of the first wear pad; engaging a first resilient wear pad retainer extending radially from the first end portion of the bushing with the inner edge of the first wear pad so that the first resilient wear pad retainer is moved into a deflected position; passing the first wear pad over the first resilient wear pad retainer so that the first resilient wear pad retainer rebounds back to an original position whereby the first wear pad is positioned and secured on the first end portion of the bushing; moving the second wear pad onto the second end portion of the bushing so that the second end portion is received through the central opening of the second wear pad; engaging a second resilient wear pad retainer extending radially from the second end portion of the bushing with the inner edge of the second wear pad so that the second resilient wear pad retainer is moved into a deflected position and passing the second wear pad over the second resilient wear pad retainer so that the second resilient wear pad retainer rebounds back to an original position whereby the second wear pad is positioned and secured on the second end portion of the bushing.

DETAILED DESCRIPTION OF EMBODIMENTS

Figure 2:
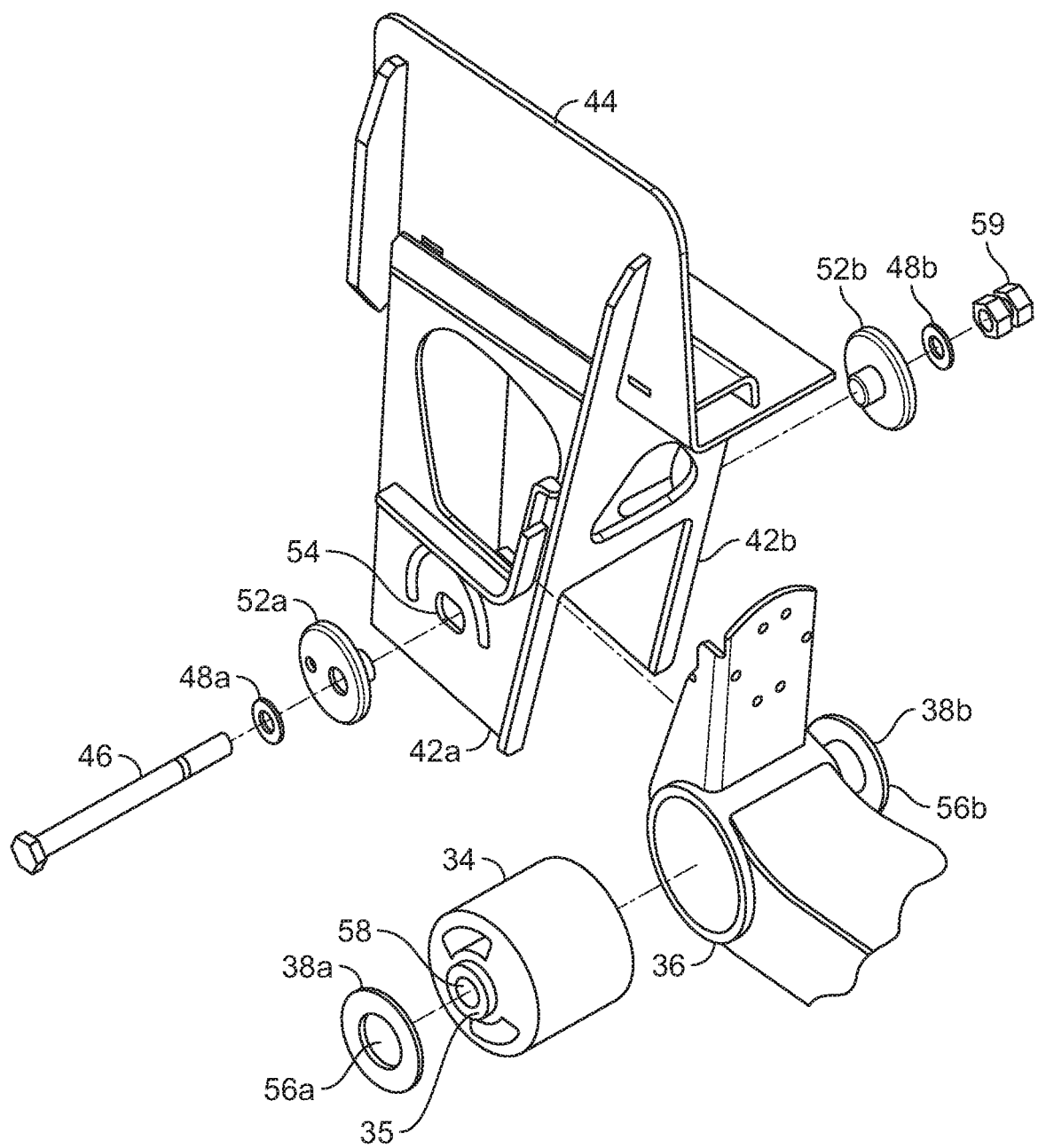
FIG. 2 is a perspective view of a bushing assembly of a prior art suspension system.
Figure 3:
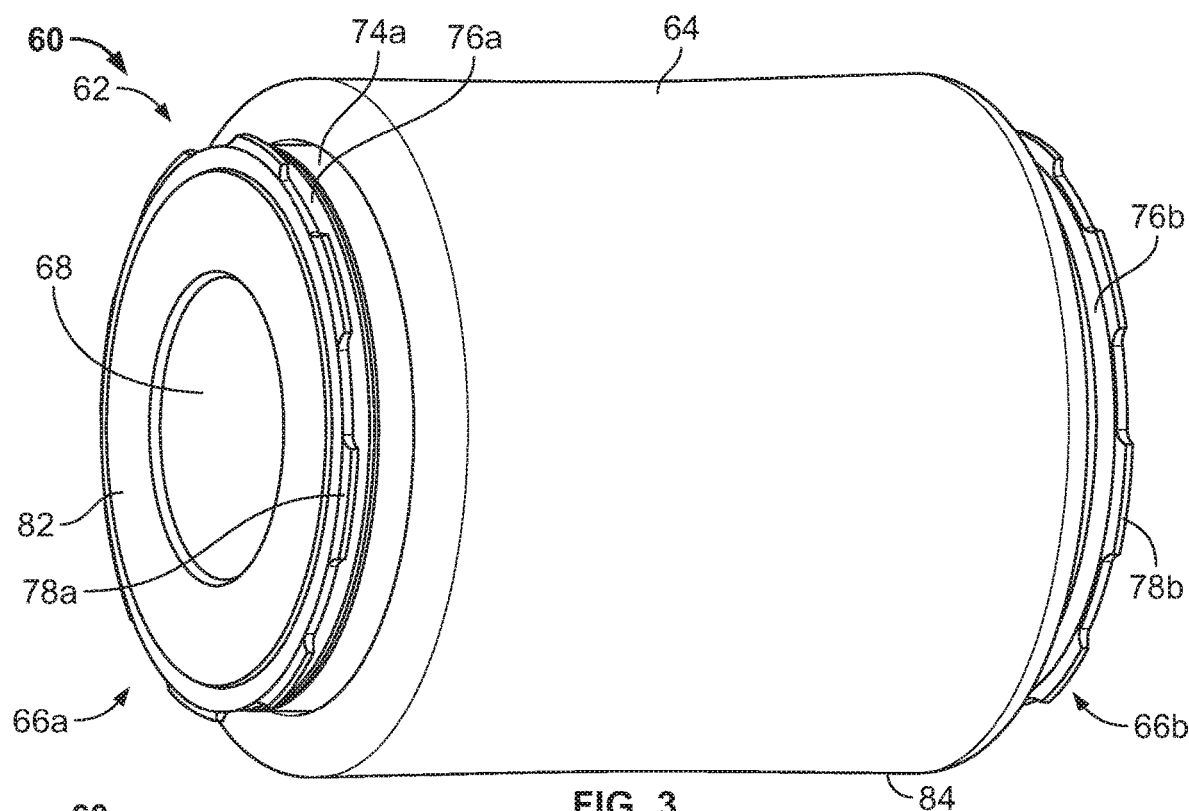
FIG. 3 is a perspective view of a first embodiment of the bushing of the disclosure.
Figure 4:
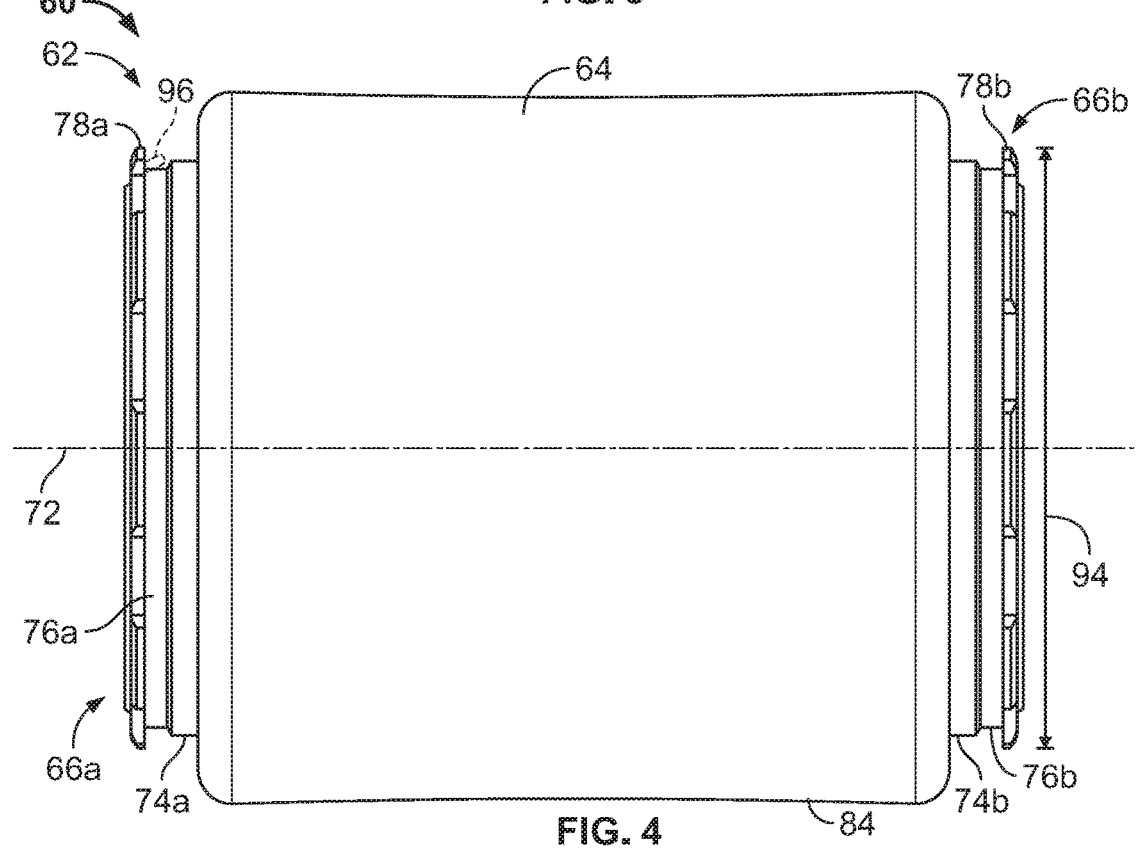
FIG. 4 is a side elevational view of the bushing of FIG. 3.

An embodiment of the bushing of the disclosure is indicated in general at 60 in FIGS. 3 and 4. The bushing features a tubular body, indicated in general at 62, having a beam support portion 64 and first and second end portions, indicated in general at 66a and 66b. The body further includes a central bore 68 (FIG. 3) which receives the bolt (such as bolt 46 of FIG. 2) or other fastener of the bushing assembly. The body is concentrically formed about a longitudinal axis 72 (FIG. 4).

First end portion 66a is provided with a reduced diameter portion 74a and a circumferential channel 76a. Second end portion 66b is similarly provided with reduced diameter portion 74b and circumferential channel 76b. A first wear pad retainer is positioned on the first end portion 66a and, in this embodiment, includes a number of resilient tabs 78a that extend radially outwards with respect to the longitudinal axis (72 of FIG. 4) of the body. The resilient tabs 78a are preferably tapered so as to feature a reduced thickness at their outer edges. A second wear pad retainer 78b of similar construction is provided on the second end portion 66b. A number of individual recesses or pockets aligned with the resilient tabs could be substituted for the circumferential channels 76a and 76b.

Figure 5:
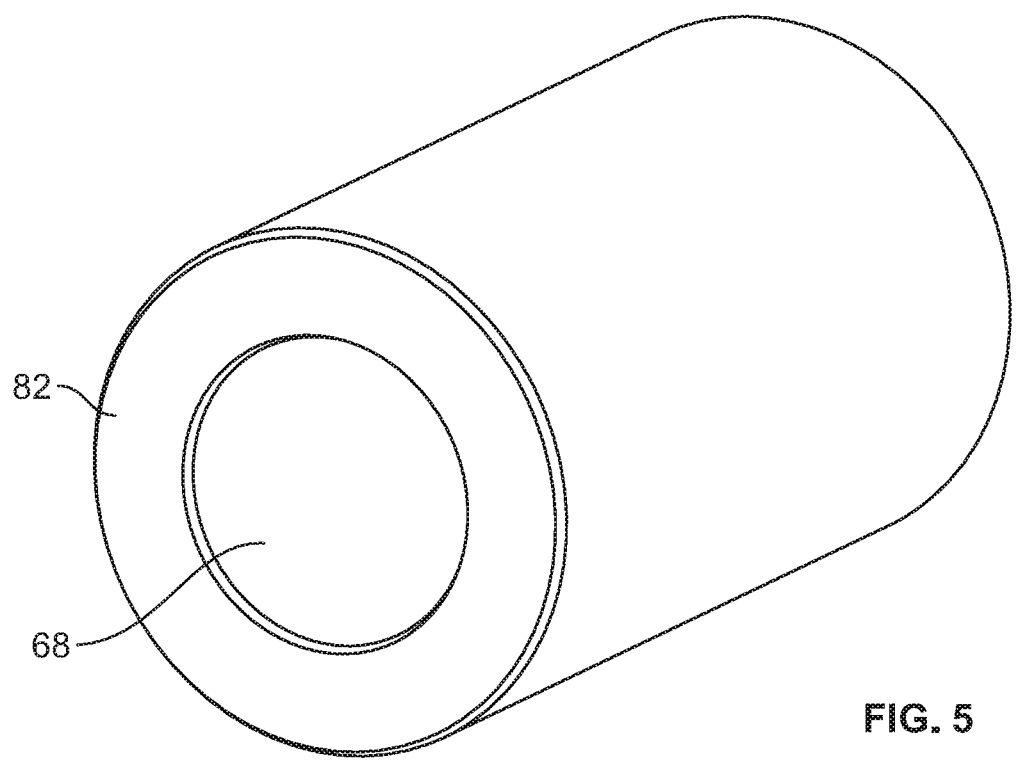
FIG. 5 is a perspective view of the core of the bushing of FIGS. 3 and 4.
Figure 6:
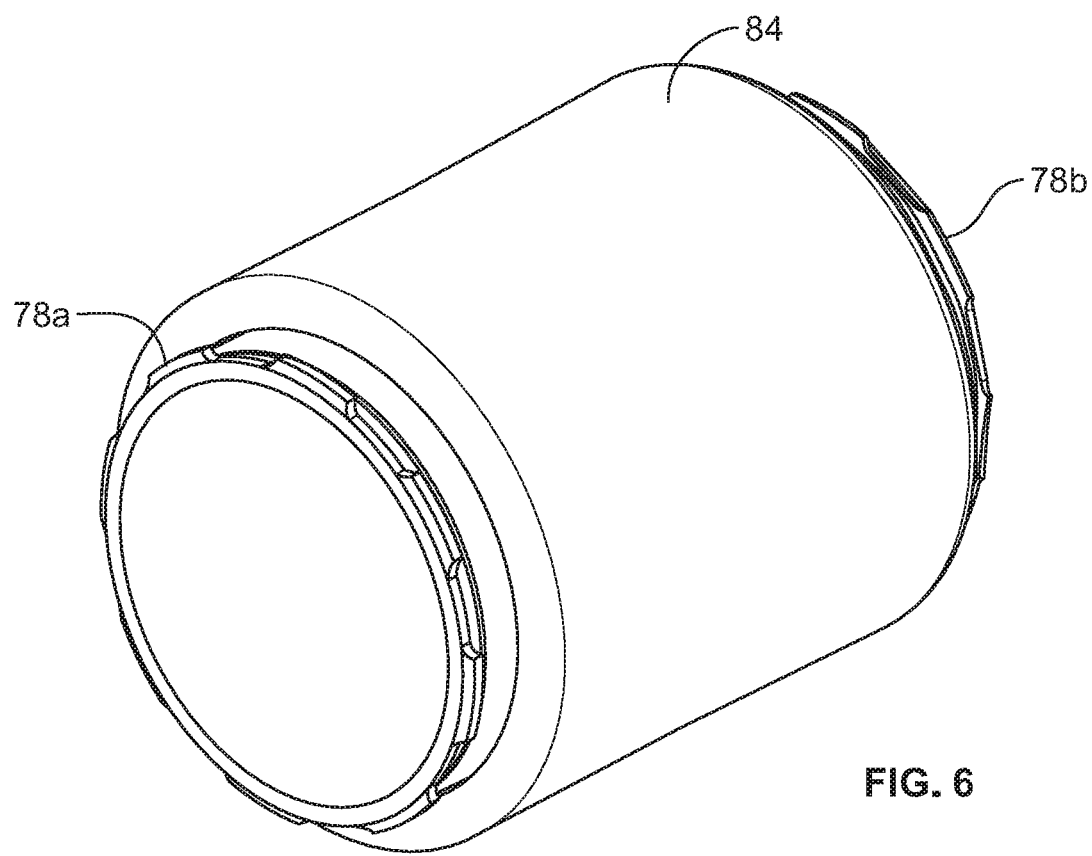
FIG. 6 is a perspective view of the jacket of the bushing of FIGS. 3 and 4.

The bushing body is preferably constructed from a central core, indicated at 82 in FIGS. 3 and 5, and an outer jacket, indicated at 84 in FIGS. 3, 4 and 6. The central core 82 is preferably constructed from a metal, such as steel, while the jacket 84 is preferably constructed from a polymer (for example, a natural rubber). In a preferred embodiment, the rubber jacket 84 is mold bonded to the steel central core 82. In alternative embodiments, the jacket may be secured to the core using adhesive, an interference fit, or other methods known in the art. Alternative materials known in the art may be used to construct the central core 82 and the outer jacket 84.

The resilient tabs 78a and 78b of the first and second wear pad retainers are preferably molded at the same time, under the same conditions and using the same material as the remaining portion of the jacket 84, and are preferably integrally formed with the jacket in a one-piece construction. In alternative embodiments, the resilient tabs 78a and 78b could be formed separately from the jacket and then joined to the body of the bushing.

Figure 7:
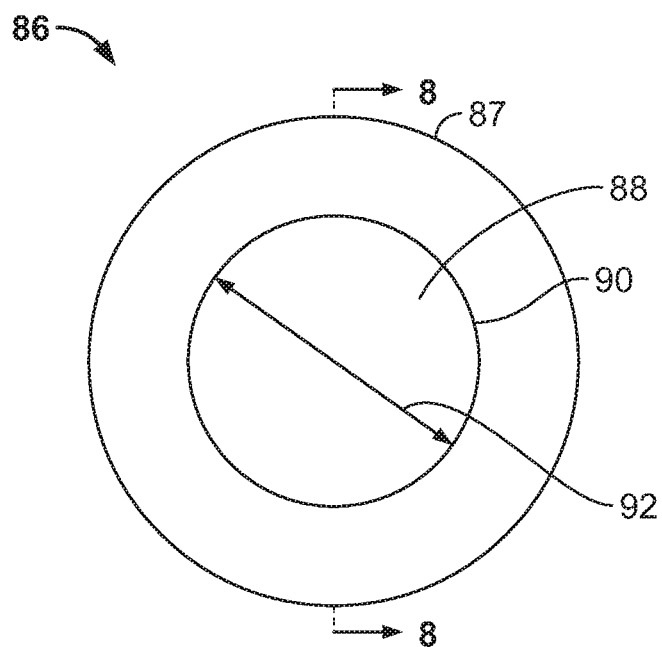
FIG. 7 is a side elevational view of a wear pad.
Figure 8:
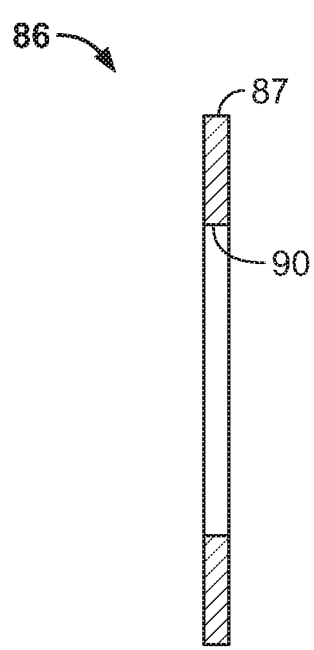
FIG. 8 is a cross sectional view of the wear pad of FIG. 7 taken along line 8-8.

An embodiment of a wear pad is indicated in general at 86 in FIGS. 7 and 8. The wear pad is washer-shaped and features an outer edge 87 and a central opening 88 defined by an inner edge 90. The central opening 88 has a diameter indicated by arrows 92. The wear pad 86 may be constructed from high molecular weight polyethylene, but any other durable material known in the art may be used.

The diameter 92 (FIG. 7) of the wear plate central opening 88 is sized to be positioned on the reduced diameter portions (74a and 74b of FIGS. 3 and 4) of the first and second end portions of the bushing body. The wear plate central opening diameter 92, however, is less than the distance between the outer edges of the tabs 78b (and the tabs 78a), indicated at 94 in FIG. 4. As a result, the tabs 78a and 78b are moved or bent into deflected positions and into the circumferential channels 76a and 76b, as indicated in phantom at 96 in FIG. 4, when moved through the central openings of wear pads and engaged with the inner edges (90 of FIGS. 7 and 8) of the wear pads.

Figure 9:
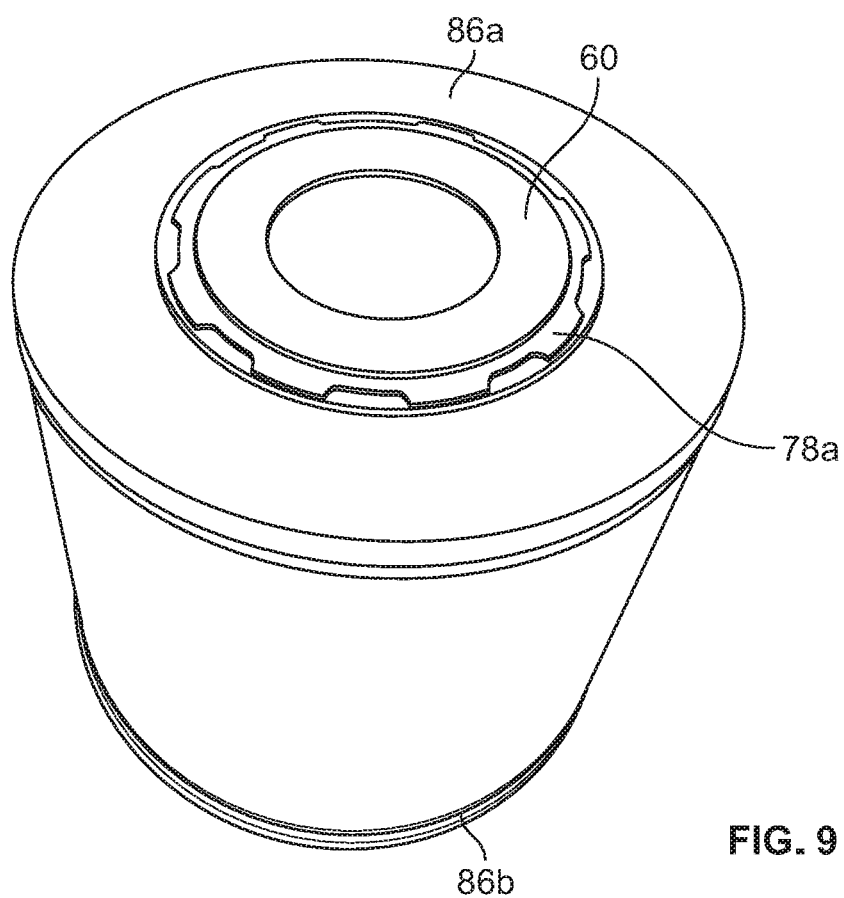
FIG. 9 is a perspective view of the bushing of FIGS. 3 and 4 with wear pads attached.

As the wear pads are moved further onto the bushing first and second end portions, towards the beam support portion 64, and onto the reduced diameter portions 74a and 74b, the inner edges of the wear pad central openings move off of the tabs 78a and 78b, which then move out of the deflected positions and the channels 76a and 76b and, being of elastic, return to their original positions. As a result, as illustrated in FIG. 9, the wear pads 86a and 86b, are positively located and secured on the bushing 60.

Therefore, as described above, the molded tabs 78a and 78b fold towards the bushing central core 82 creating a smaller outer diameter that allows the wear pads to pass over. When displaced by the wear pads, the tabs fold down, or axially inward, into the circumferential channels 76a and 76b that contain the extra rubber volume as the wear pads pass over. Once the wear pads are positioned beyond the tabs, the tabs snap back to their original, molded shape. In situations where the design space does not allow enough axial translation of the wear pads, a torsional or twisting motion will aid assembly by allowing the tabs to twist and bend out of the way and then snap back into position once the wear pads are properly located.

Figure 10:
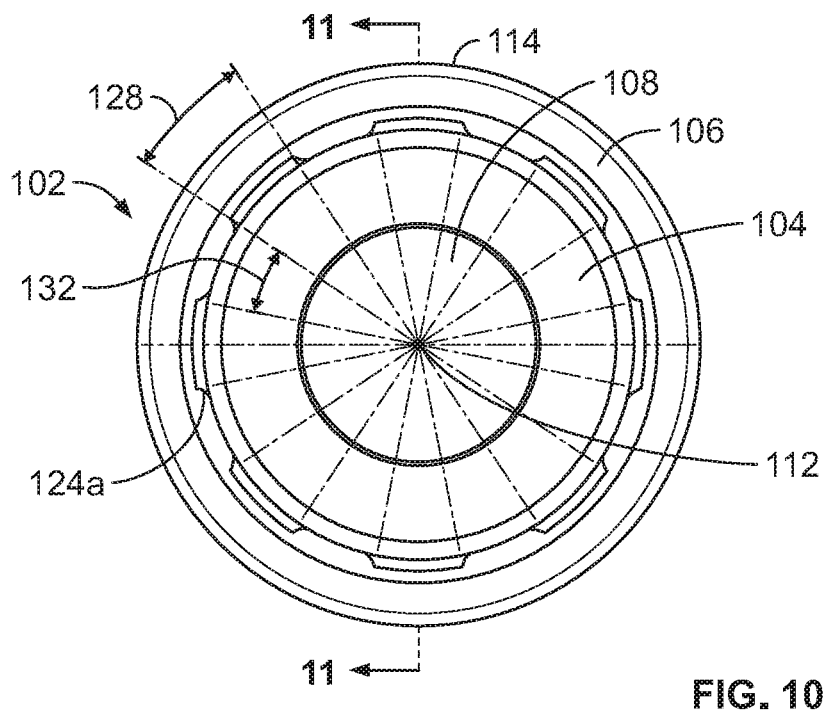
FIG. 10 is a side elevational view of a second embodiment of the bushing of the disclosure.
Figure 11:
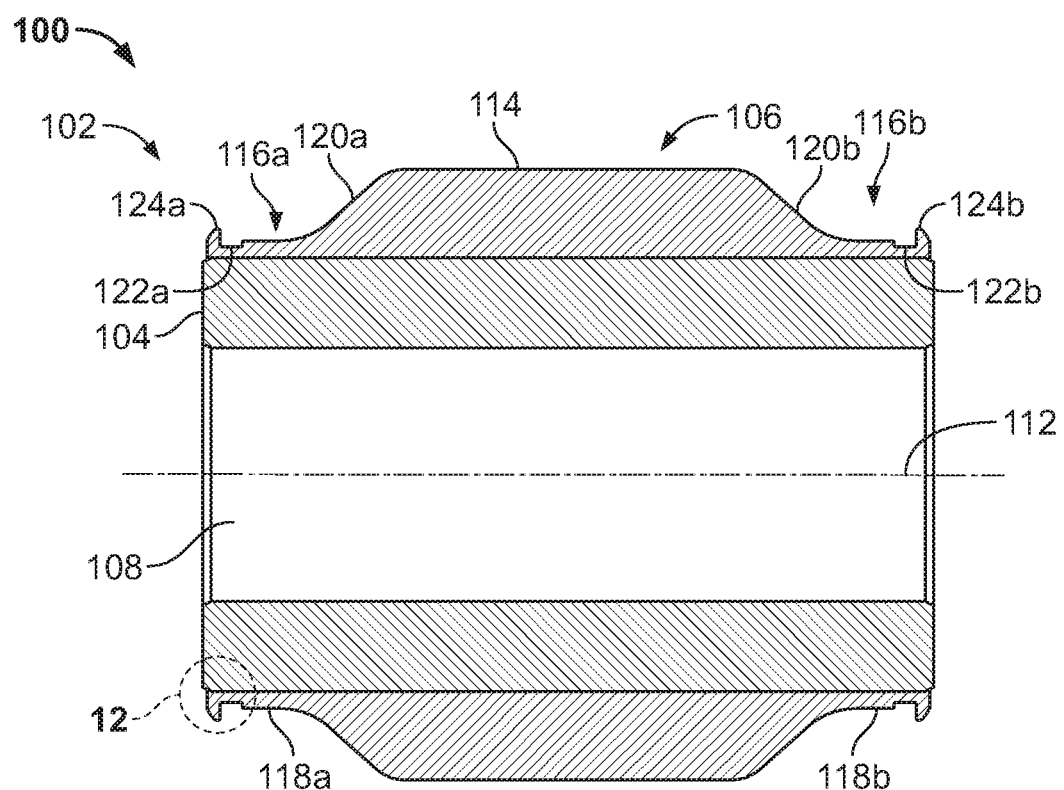
FIG. 11 is a cross sectional view of the bushing of FIG. 10 taken along line 11-11.
Figure 12:
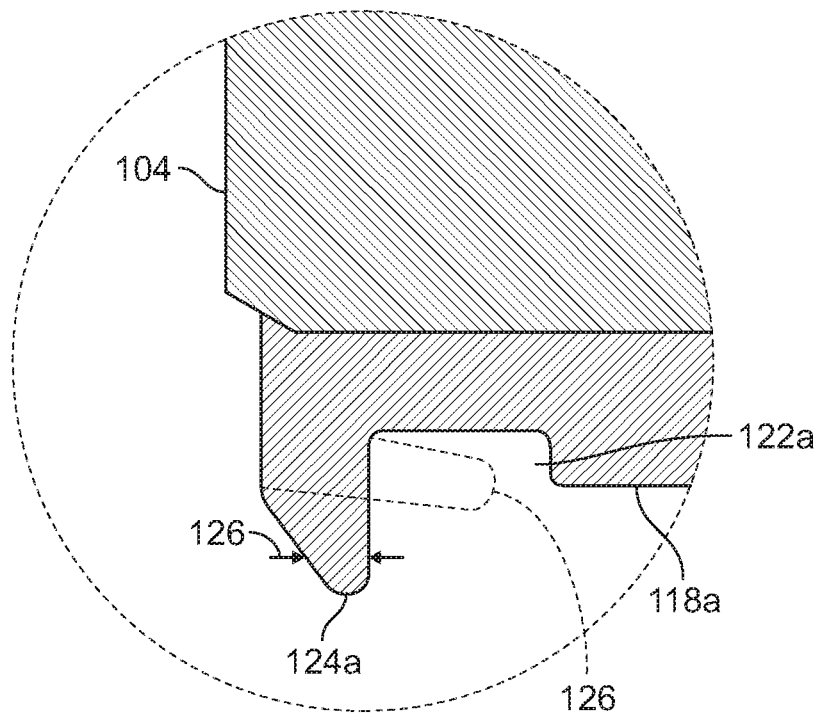
FIG. 12 is an enlarged detail view of the portion within circle 12 of FIG. 11.

An alternative embodiment of the bushing of the disclosure is indicated in general at 100 in FIGS. 10-12. Similar to the bushing of FIGS. 3-6, the bushing 100 includes a body, indicated in general at 102 in FIGS. 10 and 11, that includes a central core portion 104 (preferably constructed from steel) and a jacket portion 106 (indicated in general at 106 in FIGS. 10 and 11) that is preferably constructed from rubber that is molded to the core portion. The core portion 104 is provided with a central bore 108 that is concentric with longitudinal axis 112 (FIGS. 10 and 11).

The bushing body 102 features a beam support portion 114 and first and second end portions, indicated in general at 116a and 116b in FIG. 11. In contrast to the embodiment of FIGS. 3-6 and 9, however, the end portions taper down to reduced diameter portions 118a and 118b. The tapered sections (120a and 120b) are lead-in surfaces to aid bushing assembly, and help to prevent air bubbles (resulting from air traps which tend to occur in sharp corners) during the molding process. The first and second end portions are also provided with circumferential channels 122a and 122b.

A first wear pad retainer is positioned on the first end portion 116a and, in this embodiment, also includes a number of resilient tabs 124a that extend radially outwards with respect to the longitudinal axis (112 of FIGS. 10 and 11) of the bushing body. As illustrated in FIG. 12, the resilient tabs 124a are preferably tapered in a direction that increases the tab height as one travels axially inward (towards the beam support portion of the bushing) so as to feature a reduced thickness, indicated by arrows 126, at their outer edges. This profile eases installation of a wear pad onto the bushing, and the tapered tabs help lead the wear pad with their wedge shape to help keep or guide the wear pad to be concentric with the series of tabs. The profile also resists removal of the wear pad from the bushing once installed, since there is no wedge shape on the back side. In addition, the resilient tabs 124a may feature the same arcuate length, indicated by arrow 128 of FIG. 10, and the angular spacing between the tabs, indicated by arrow 132 in FIG. 10, may be the same. A second wear pad retainer 124b of similar construction is provided on the second end portion 116b.

With reference to FIG. 12, the radii at the outer edge of tab 124a, the two corners of channel 122a and the edge defined between portion 112a and the channel 122a reduce stresses in the rubber (to aid in preventing the tabs from ripping or tearing off), and help avoid air traps (i.e. air bubbles) that tend to form in sharp corners during the molding process.

Wear pads of the type illustrated in FIGS. 7 and 8 may be mounted on the bushing 100 of FIGS. 10-12 in the same manner as used for the bushing of FIGS. 3-6. More specifically, the tabs 124a and 124b (FIGS. 10-12) are moved into deflected positions within the circumferential channels 122a and 122b, as indicated in phantom at 136 in FIG. 12, when moved through the central openings of wear pads and engaged with the inner edges (90 of FIGS. 7 and 8) of the wear pads. As the wear pads are moved further onto the bushing first and second end portions, towards the beam support portion 114, and onto the reduced diameter portions 118a and 118b, the inner edges of the wear pad central openings move off of the tabs 124a and 124b, which then move out of their deflected positions and channels 122a and 122b and return to their original positions. As a result, as illustrated in FIG. 13, the wear pads, indicated at 138a and 138b, are positively located and secured on the bushing 100.

Figure 1:
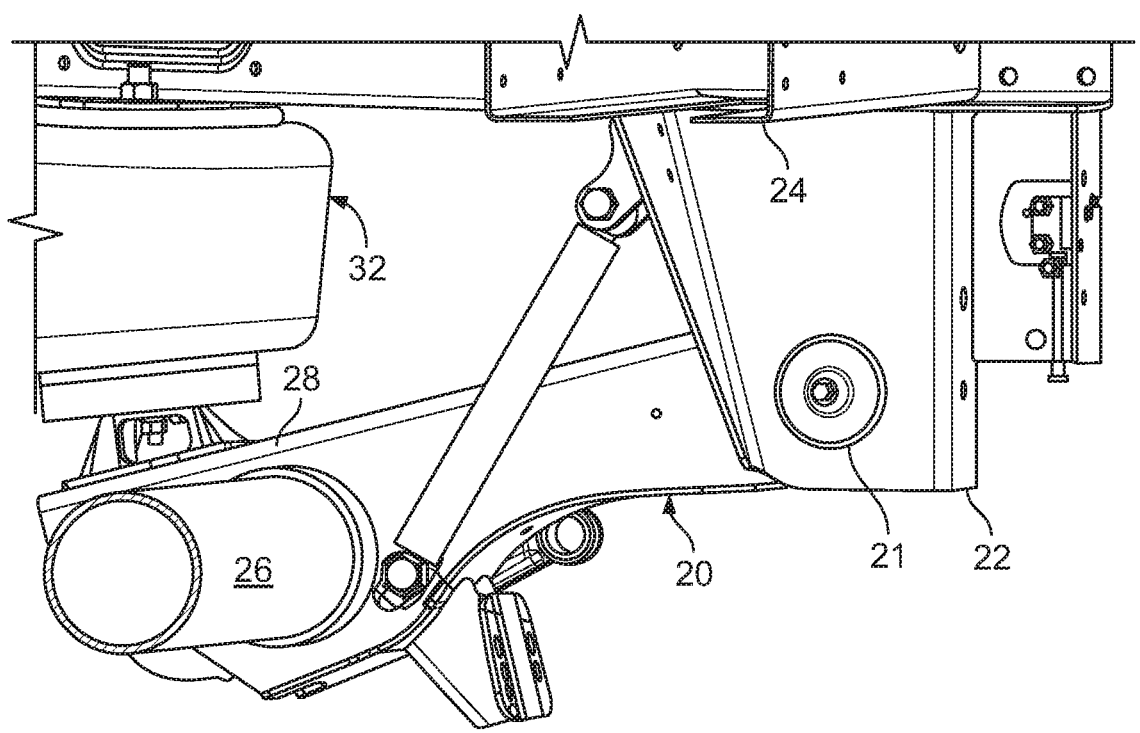
FIG. 1 is a perspective view of a prior art trailing annrm suspension system.
Figure 13:
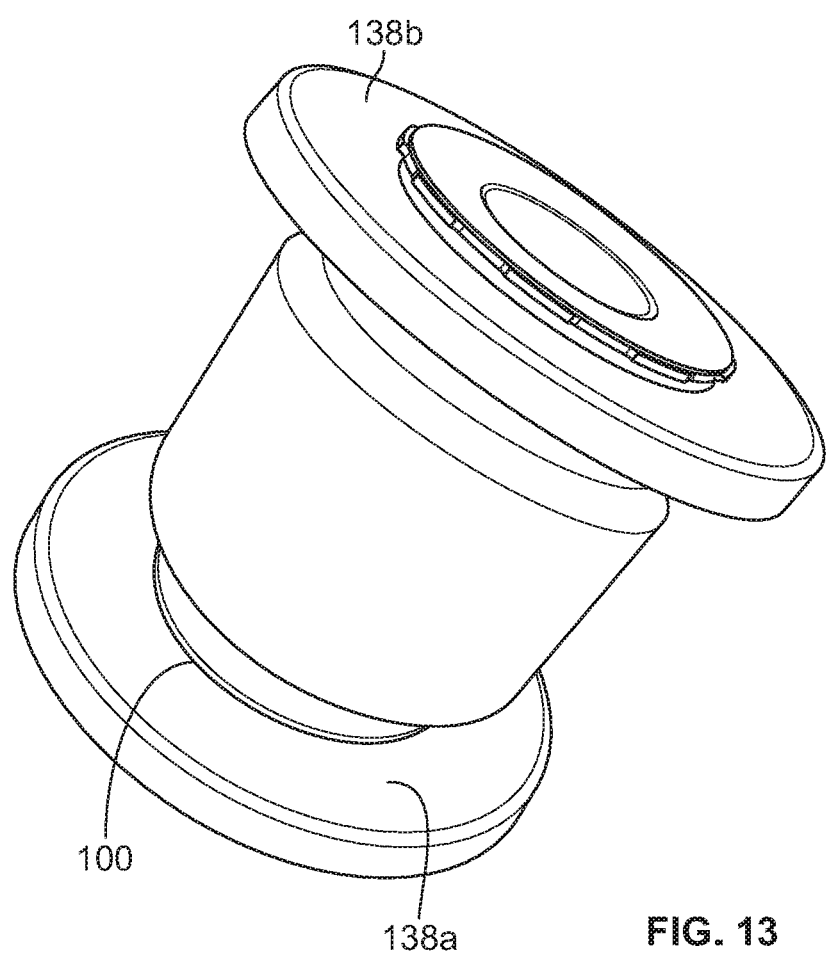
FIG. 13 is a perspective view of the bushing of FIGS. 10-12 with wear pads installed.
Figure 14:
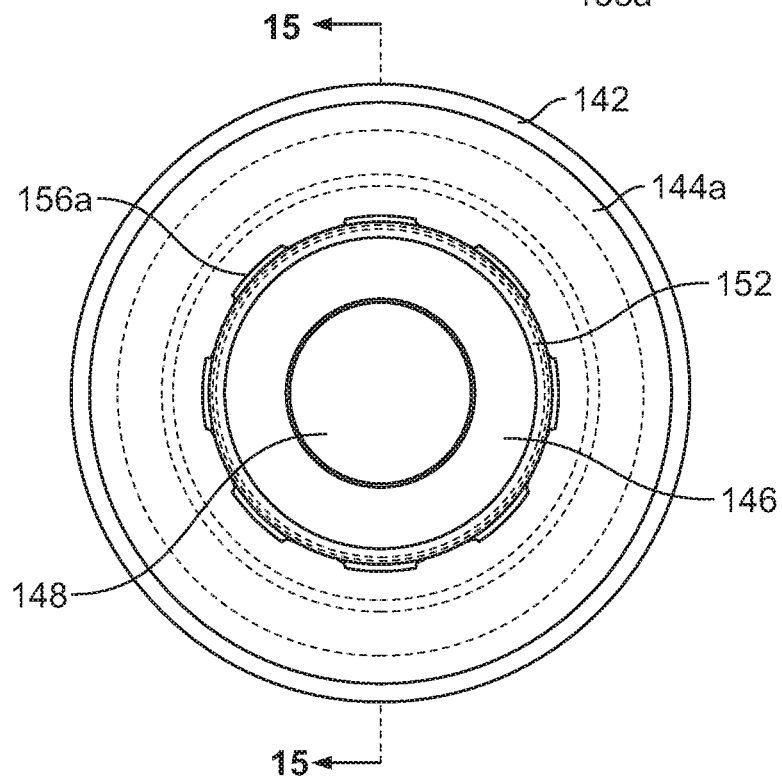
FIG. 14 is a side elevational view of the bushing and wear pads of FIG. 13 installed within a beam tube.
Figure 15:
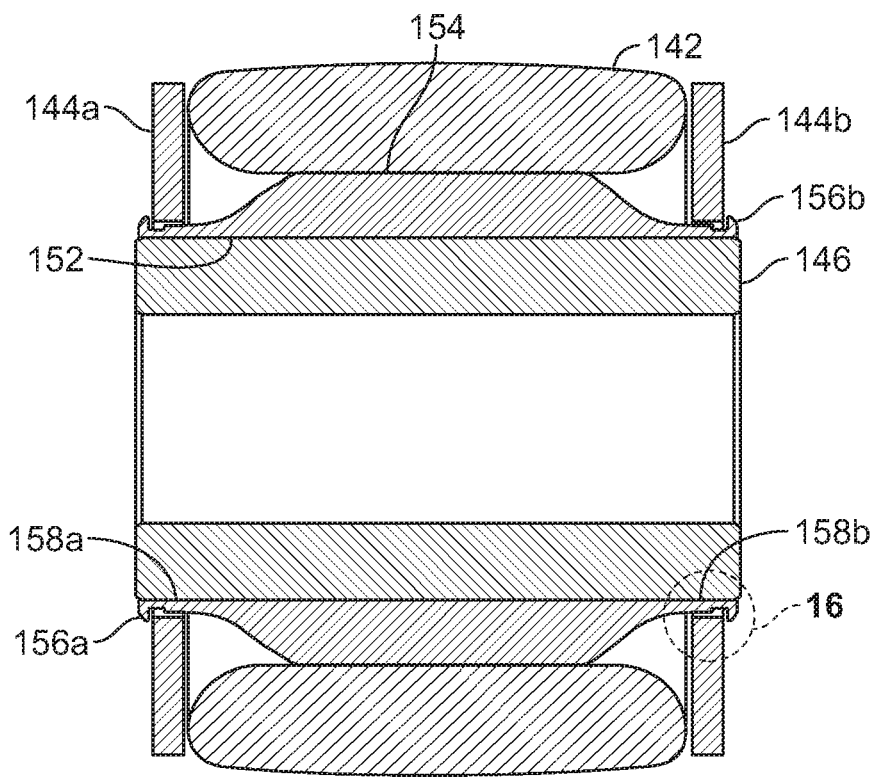
FIG. 15 is a cross sectional view of the bushing, wear pads and beam tube of FIG. 14 taken along line 15-15.
Figure 16:
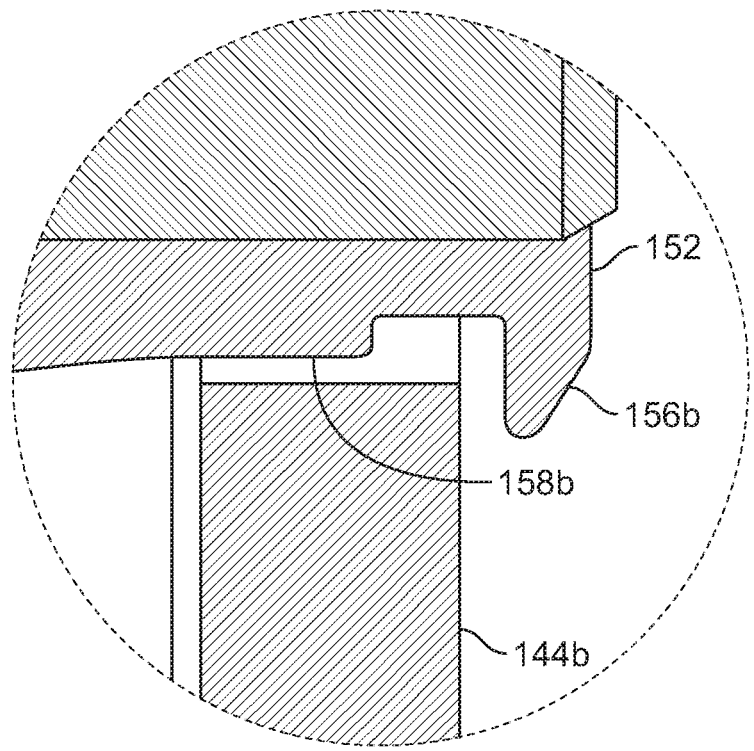
FIG. 16 is an enlarged detail view of the portion within circle 16 of FIG. 15.
Figure 17:
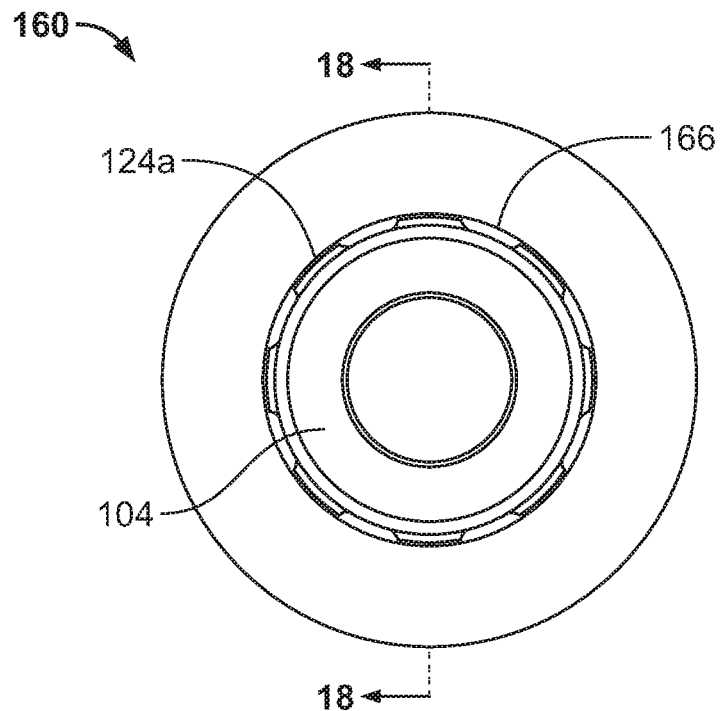
FIG. 17 is a side elevational view of an alternative embodiment of a wear pad installed on the bushing of FIGS. 11 and 12.

FIGS. 14-16 illustrate the bushing and wear pad assembly of FIG. 13 as mounted within a cast beam tube (in contrast to the fabricated beam with a steel tube 36 of FIG. 2) of a vehicle trailing arm suspension beam (such as 20 in FIG. 1). The beam tube is indicated at 142 in FIGS. 14 and 15, while the wear pads are indicated at 144a and 144b in FIGS. 14-16. As in the embodiments described previously, the bushing includes a central core 146 having a central bore 148. A jacket 152, which may be constructed from rubber, is secured to the core and features a beam support portion 154 which, as indicated in FIG. 15, engages the inner surface of the beam tube 36 in an interference fit fashion. The end portions of the bushing are provided with wear pad retainers in the form of radially extending resilient tabs 156a and 156b which, in the manner described above, secure the wear pads 144a and 144b on reduced diameter portions 158a and 158b of the bushing.

With reference to FIGS. 17-20, an alternative embodiment of the wear pad is indicated in general at 160. The wear pad features a central opening 162 defined by an inner edge 164. The central opening is surrounded by an annular recess 166 so that a "stepped washer" shape is formed. The wear pad 160 may be constructed from high molecular weight polyethylene, but any other durable material known in the art may be used.

As in previous embodiments, the diameter the central opening 162 is sized to be positioned on the reduced diameter portions of the first and second end portions of the bushing body. The wear plate central opening diameter, however, is less than the distance between the outer edges of the tabs 124a and 124b (also shown in FIGS. 11 and 12). As a result, as in previous embodiments, the tabs are moved or bent into deflected positions when moved through the central opening of wear pad and engaged with the inner edge 164.

Figure 18:
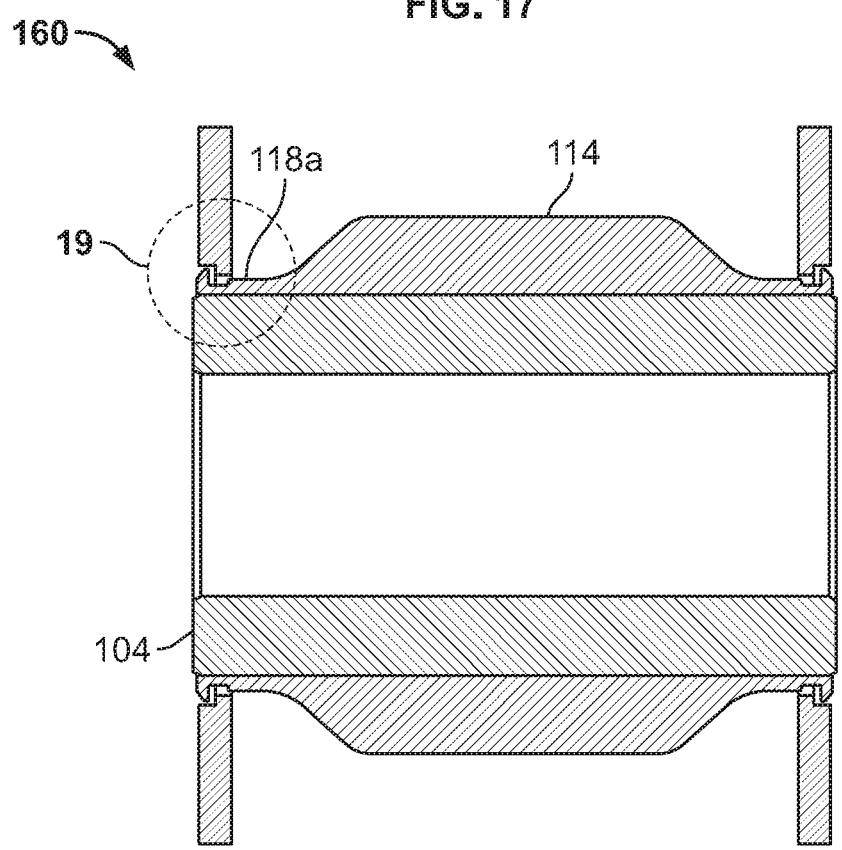
FIG. 18 is a cross sectional view of the bushing and wear pads of FIG. 17 taken along line 18-18.
Figure 19:
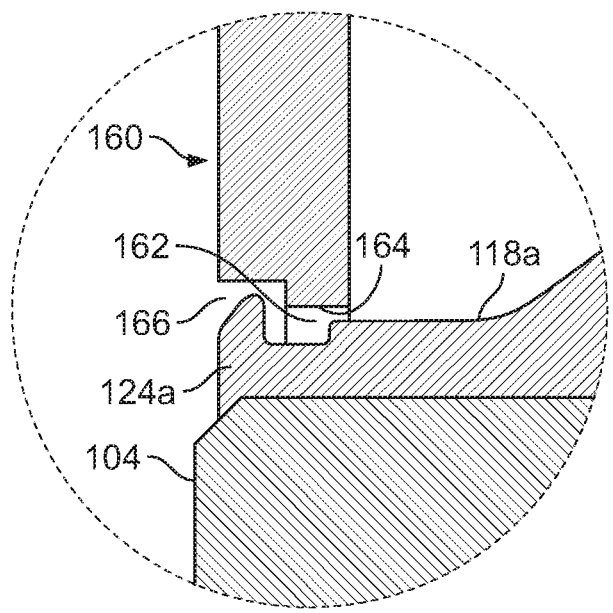
FIG. 19 is an enlarged detail view of the portion within circle 19 of FIG. 18.
Figure 20:
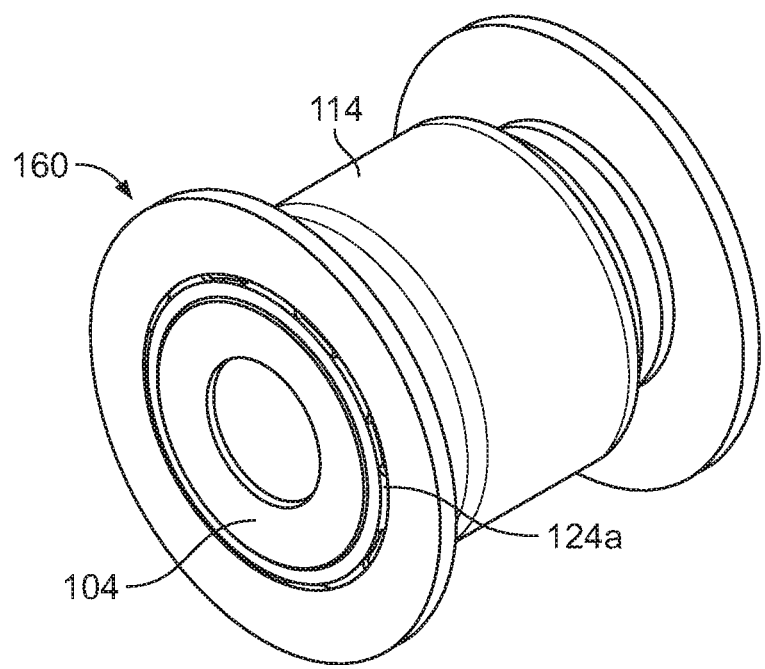
FIG. 20 is a perspective view of the bushing and wear pads of FIGS. 17-19.

As a wear pad 160 is moved further onto the bushing first (or second) end portion, towards the beam support portion 114 of the bushing, and onto the reduced diameter portion 118a, the inner edge of the wear pad central opening moves off of the tabs 124a, which then move out of their deflected positions and, being of elastic, return to their original positions, best illustrated in FIGS. 18 and 19. As a result, as best illustrated in FIG. 19, the wear pad is positively located and secured on the bushing with the tabs 124a positioned in the annular recess 166. As illustrated in FIG. 20, the recess 166 causes the tabs to be flush with respect to the outer surface of the wear pad to allow for clearance if required by the application.

Of course the wear pad 160 of FIGS. 17-20 may be mounted on the bushing of FIGS. 3-6, or other embodiments of the bushing of the disclosure.

In alternative embodiments, the first and second wear pad retainers may take the form of a circumferential resilient rib instead of tabs. Further alternatives include radially extending resilient splines formed on the first and second end portions of the bushing and that run parallel with the longitudinal axis of the bushing with or without axial interruption. Similar to the resilient tabs for the embodiments described above, the rib or splines move into a deflected position and then rebound into an original position as the end portions of the bushing are moved through the central openings of wear pads so that the wear pads are secured to the sides of the bushing. As a still further embodiment, the first and second end portions may be formed with diameters that are sized slightly larger than the diameter of the wear plate central opening. As a result, an interference fit is formed between the inner edge of the wear plate central opening and the first and second wear pad retainers on the first and second end portions of the bushing.

In further alternative embodiments, the circumferential channel (76a and 76b of FIGS. 4 and 122a and 122b of FIG. 11) may be replaced with individual recesses or pockets that receive corresponding resilient tabs when in the deflected position. In still further embodiments, the circumferential channels and recesses may be omitted entirely.

While the preferred embodiments of the disclosure have been shown and described, it will be apparent to those skilled in the art that changes and modifications may be made therein without departing from the spirit of the disclosure, the scope of which is defined by the following claims.

What is claimed is:

1. A bushing for pivotally mounting an end portion of an axle-supporting beam of a vehicle suspension system to a hanger bracket of the vehicle with a pair of wear pads positioned between sides of the end portion of the beam and the hanger bracket, where the pair of wear pads each has a central opening defined by an inner edge, the bushing comprising:
   a. a tubular body having a longitudinal axis, a first end portion, a second end portion and a beam support portion positioned between the first and second end portions;
   b. a first resilient wear pad retainer extending radially from the first end portion of the body and a second resilient wear pad retainer extending radially from the second end portion of the body, each of said first and second wear pad retainers configured to move into a deflected position when contacted by an inner edge of a wear pad central opening and to rebound back to an original position afterwards as the wear pad is positioned on the first or second end portions of the body so that the wear pad is secured to the bushing.

2. The bushing of claim 1 wherein each of the first and second wear pad retainers includes a plurality of tabs positioned in a spaced relation around a circumference of the first or second end portion of the bushing body.

3. The bushing of claim 2 wherein each of the plurality of tabs is tapered to a reduced thickness in a direction moving radially away from the longitudinal axis of the body.

4. The bushing of claim 3 wherein the plurality of tabs are equally spaced around the circumference of the first or second end portion.

5. The bushing of claim 2 wherein the plurality of tabs are equally spaced around the circumference of the first or second end portion.

6. The bushing of claim 2 wherein each of the first and second end portions of the bushing body includes a reduced diameter portion configured to engage at least a portion of an inner edge of a wear pad central opening.

7. The bushing of claim 2 wherein the first end portion of the bushing body includes a first circumferential channel positioned adjacent to the first wear pad retainer and the second end portion of the bushing body includes a second circumferential channel positioned adjacent to the second wear pad retainer, said first and second circumferential channels configured to receive the first and second wear pad retainers when they are in the deflected position.

8. The bushing of claim 1 wherein each of the first and second wear pad retainers includes an annular rib extending circumferentially around the first or second end portion of the bushing body.

9. The bushing of claim 8 wherein the rib is tapered to a reduced thickness in a direction moving radially away from the longitudinal axis of the body.

10. The bushing of claim 1 wherein each of the first and second end portions of the bushing body includes a reduced diameter portion configured to engage at least a portion of an inner edge of a wear pad central opening.

11. The bushing of claim 1 wherein the first end portion of the bushing body includes a first circumferential channel positioned adjacent to the first wear pad retainer and the second end portion of the bushing body includes a second circumferential channel positioned adjacent to the second wear pad retainer, said first and second circumferential channels configured to receive the first and second wear pad retainers when they are in the deflected position.

12. The bushing of claim 1 wherein the first end portion of the bushing body includes a first recess positioned adjacent to the first wear pad retainer and the second end portion of the bushing body includes a second recess positioned adjacent to the second wear pad retainer, said first and second recesses configured to receive the first and second wear pad retainers when they are in the deflected position.

13. The bushing of claim 1 wherein the body of the bushing is constructed from a tubular core including a core material and a jacket including a jacket material covering and secured to at least a portion of the tubular core.

14. The bushing of claim 13 wherein the first and second wear pad retainers are integrally formed with the jacket in a one-piece construction.

15. The bushing of claim 13 wherein the core material is steel and the jacket material is rubber.

16. An assembly comprising:
   a. a bushing including:
      i) a tubular body having a longitudinal axis, a first end portion, a second end portion and a beam support portion positioned between the first and second end portions;
      ii) a first resilient wear pad retainer extending radially from the first end portion of the body;
      iii) a second resilient wear pad retainer extending radially from the second end portion of the body;
   b. a first wear pad including a first wear pad inner edge defining a first wear pad central opening, said first wear pad central opening having a first diameter such that said first wear pad retainer moves into a deflected position when contacted by the first wear pad inner edge and rebounds back to an original position afterwards as the first wear pad is positioned on the first end portion of the bushing body so that the first wear pad is secured to the bushing;
   c. a second wear pad including a second wear pad inner edge defining a second wear pad central opening, said second wear pad central opening having a second diameter such that said second wear pad retainer moves into a deflected position when contacted by the second wear pad inner edge and rebounds back to an original position afterwards as the second wear pad is positioned on the second end portion of the bushing body so that the second wear pad is secured to the bushing.

17. An assembly comprising:
   a. a bushing including:

i) a tubular body having a longitudinal axis, a first end portion, a second end portion and a beam support portion positioned between the first and second end portions;

ii) a first resilient wear pad retainer extending radially from the first end portion of the body;

b. a first wear pad including a first wear pad inner edge defining a first wear pad central opening, said first wear pad central opening having a first diameter such that said first wear pad retainer moves into a deflected position when contacted by the first wear pad inner edge and rebounds back to an original position afterwards as the first wear pad is positioned on the first end portion of the bushing body so that the first wear pad is secured to the bushing;

c. said first wear pad further including an annular recess surrounding the central opening and configured so that the first wear pad retainer is positioned therein when the wear pad is installed on the bushing.

\* \* \* \* \*